United States Patent [19]

Iwai

[11] Patent Number: 4,794,381
[45] Date of Patent: Dec. 27, 1988

[54] ELECTRONIC APPARATUS
[75] Inventor: Masahiro Iwai, Nara, Japan
[73] Assignee: Sharp Kabushiki Kaisha, Osaka, Japan
[21] Appl. No.: 904,711
[22] Filed: Sep. 8, 1986
[30] Foreign Application Priority Data Sep. 9, 1985 [JP] Japan .................. 60-139069[U]

[51] Int. Cl.$^4$ ............................................. G05G 1/00
[52] U.S. Cl. .................. 340/700; 340/365 R; 358/169; 358/254
[58] Field of Search .......... 340/700, 365 R; 74/553, 74/555; 324/121 R; 358/169, 254, 903

[56] References Cited

U.S. PATENT DOCUMENTS

| 4,011,506 | 3/1977 | Bowden | 324/121 R |
| 4,104,725 | 8/1978 | Rose et al. | 324/121 R |
| 4,496,943 | 1/1985 | Greenblatt | 340/700 |
| 4,561,565 | 12/1985 | Wolf et al. | 74/553 |

Primary Examiner—Gerald L. Brigance
Assistant Examiner—Mahmoud Fatahiyar
Attorney, Agent, or Firm—Birch, Stewart, Kolasch & Birch

[57] ABSTRACT

In an electronic apparatus made up of a main body and an external output unit to be integrally coupled with the main body and adapted such that an electric connection between the two units is provided by the coupling, an electrical control system is disclosed which comprises a control knob disposed on one side of the main body at the joining position, an adjustment knob accessible from the outside when the units are coupled and function to cause the control knob to operate in conjunction therewith, and a transmission mechanism for transmitting an operating force applied to the adjustment knob of the output unit to the control knob of the main body when these units are coupled, whereby control of the electrical connection of the main body is provided from the outside when these units are coupled.

3 Claims, 4 Drawing Sheets

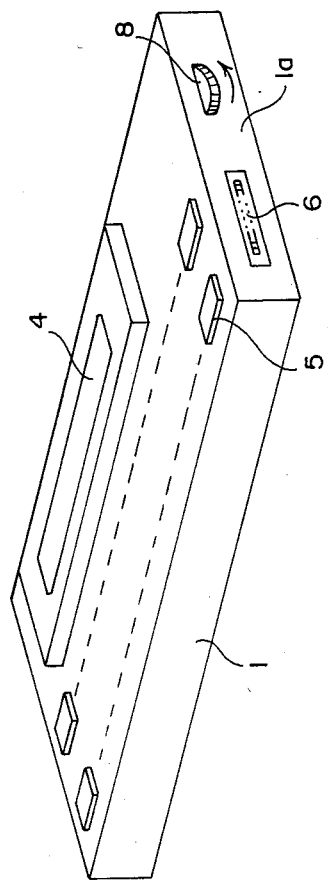
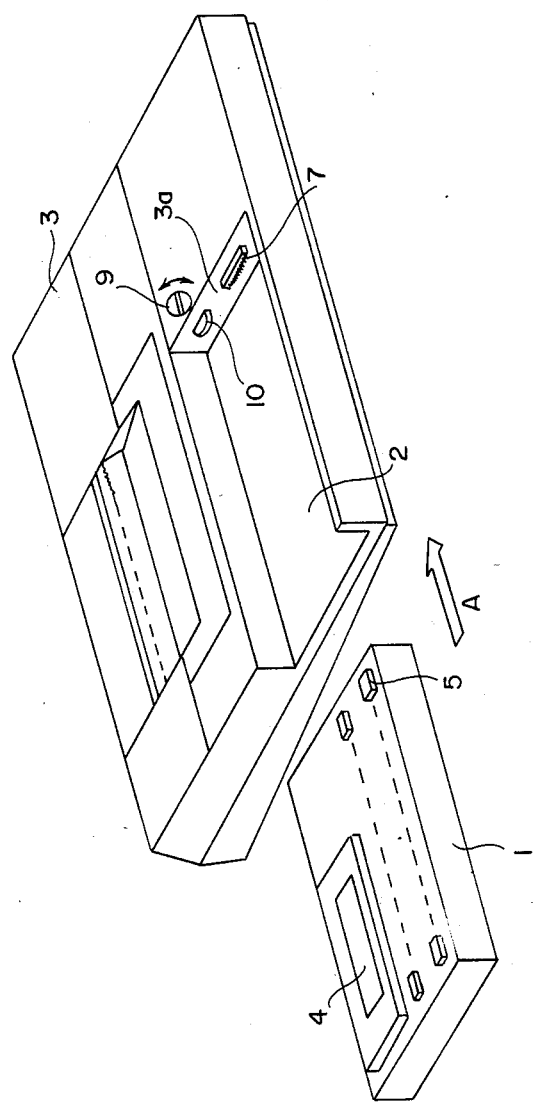

ELECTRONIC APPARATUS

BACKGROUND OF THE INVENTION

The present invention relates to an electronic apparatus made up of a main body and an external output unit to be integrally coupled with the main body and adapted such that an electric connection between the two units is provided by the coupling.

Nowadays, there are in use some pocket computers or the like which are adapted such that an external output unit is connected with the main body of the pocket computer to provide the same with an additional function such as a printing function.

In such electronic apparatus, there are cases where a control knob of the main body thereof, when the same is connected with the output unit, is hidden in the joint portion. Therefore, it has so far been practiced, when necessary, to separate the main body from the output unit for operating the control knob, or to provide the apparatus with a special electric circuit which functions when these units are joined together.

SUMMARY OF THE INVENTION

In view of the foregoing, a primary object of the present invention is the provision of an electronic apparatus in which a control knob of the main body to be received in the output unit of the apparatus when the main body is integrally coupled with an external output unit is made operable from the outside.

In accordance with the present invention there is provided an electronic apparatus made up of a main body and an external output unit to be integrally coupled with the main body and adapted such that an electric connection between the two units is provided by the coupling, which coupling comprises a control knob disposed on the side of the main body at the joint portion, an adjustment knob accessible from the outside when the units are coupled and operable for causing the control knob to operate in conjunction therewith, and a transmission means for transmitting an operating force applied to the adjustment knob to the control knob of the main body when these units are coupled, such that output control of the main body is provided from the outside when these units are coupled.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is an external view of an electronic apparatus of the present invention;

FIG. 2 is an external view of the main body of the electronic apparatus;

DETAILED DESCRIPTION OF THE INVENTION

Figure 3:
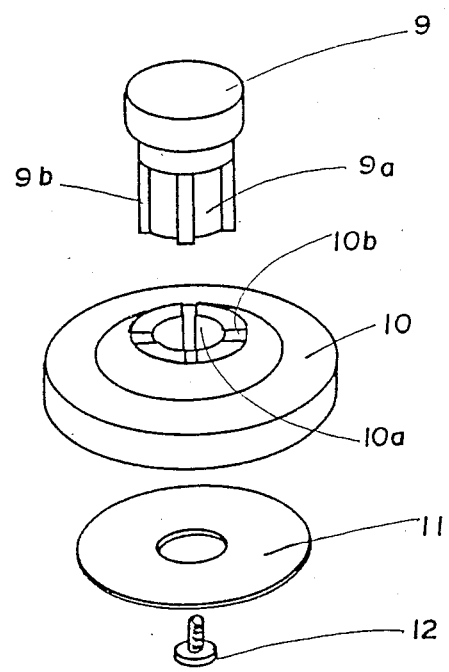
FIGS. 3 and 4 are structural drawings of a knob portion of the electronic apparatus.

FIG. 1 is an external view of an electronic apparatus according to an embodiment of the present invention, which is constructed of a main body 1 made up of a pocket computer and an external output unit 3 made up of an optional printer with a portion 2 for receiving the main body 1, into which the main body 1 is adapted to be inserted in the direction as indicated by the arrow A.

The main body 1 is provided thereon with a display portion 4 and key buttons 5, and enabled to output displays of operations performed in accordance with the four rules of arithmetic and others.

The main body 1 is provided, as shown in FIG. 2, with a connector 6 disposed on its joining surface 1a to be joined with the external output unit 3, and this connector 6 of the main body 1 is located, as shown in FIG. 1, in correspondence with a connector 7 of the external output unit 3.

Both connectors 6 and 7 adapted to be connected when these two units 1 and 3 are integrally coupled, whereby an electric connection between these units 1 and 3 is provided.

On the joining surface 1a of the main body 1, there is further provided a control knob 8 for adjusting display contrast, which when rotated in the direction as shown by the arrow allows the display density of the display portion 4 to be raised.

In the present embodiment, the external output unit 3 is provided with an adjustment knob 9. The adjustment knob 9 is disposed in an exposed manner at a portion other than the joining portion between the two units 1 and 3 and is accessible by the user or the like when these units are coupled. The adjustment knob 9 is made rotatable in the directions indicated by the arrowheads, and when the adjustment knob 9 is rotated, in conjunction therewith, a transmission means in the form of a rubber roller 10, which partly sticks out of the surface 3a of the external output unit 3, on which the above mentioned connector 7 is provided, and which is in abutment with the surface 1a of the main body 1 is caused to rotate.

Construction of the above mentioned adjustment knob 9 and rubber roller 10 will be described with reference to FIGS. 3 and 4. Referring to FIG. 3, the adjustment knob 9 and the rubber roller 10 are fixedly combined by engagement of protruded portions 9b formed on the projection 9a of the knob 9 with the recessed portions 10b formed in the hole 10a of the roller 10 and the combination is made secure by being fastened by a washer 11 and a vis 12.

Figure 4:
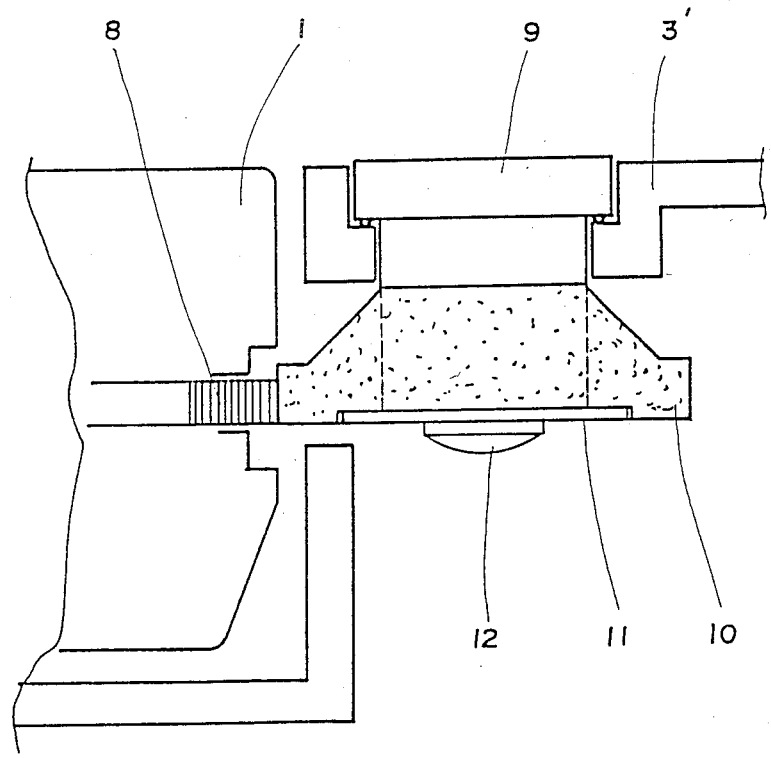

The assembled state is shown in FIG. 4, wherein the main body 1 and cabinet 3 of the external output unit 3 are depicted. The remaining components are denoted by like numerals in the above mentioned FIGS. 1 and 2.

When the main body 1 is integrally coupled with the external output unit 3 (3'), the rubber roller 10 is maintained in contact with the control knob 8 receiving pressure therefrom to such an extent that the same is suitable compressed. Hence, if the adjustment knob 9 is rotated, the turning effect (operating force) is transmitted to the rubber roller 10 and, further, to the control knob 8. Consequently, the control knob 8 is rotated and the display contrast of the main body 1 can be adjusted.

Figure 5:
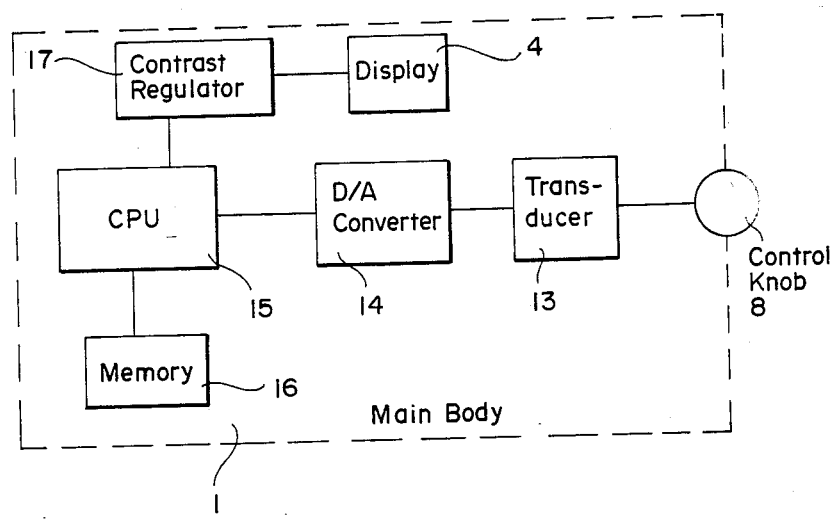
FIG. 5 is an internal circuit diagram of the main body of the electronic apparatus.

As shown in FIG. 5, as the control knob 8 is rotated, a transducer 13 converts the rotated angle to a change in electric resistance, the change in resistance is digitized by an A/D (analogue-to-digital) converter 14, and the data is input to a central processing unit CPU 15. Then, the CPU 15 reads out the contrast data stored in a specific address of a memory 16 according to the input data and delivers the predetermined contrast data to a contrast regulator 17. As a result, the display portion 4 is adjusted to the contrast in accordance with the angle of rotation of the control knob 8.

It is, of course, to be understood that the present invention is by no means limited to the control knob for the display contrast adjustment as illustrated in the above described embodiment.

As described above, the electronic apparatus according to the present invention, has a main body and external output unit which can be integrally coupled, a control knob disposed on the side of the main body at the joint portion, an adjustment knob accessible from outside when these two units are coupled and operable for causing the control knob to operate in conjunction therewith, and transmission means for transmitting the operating force applied to the adjustment knob on the external output unit when the two units are coupled to the control knob on the main body, and thus, it is made possible to make electrical output adjustment of the main body from the external output unit when these units are integrally coupled. Therefore, when the main body is in the state of being coupled with the external output unit, to operation of the control knob, which is then inaccessible from the outside, of the main body, is made practical by means of a simple economical mechanism.

While only certain embodiments of the present invention have been described, it will be apparent to those skilled in the art that various changes and modifications may be made therein without departing from the spirit and scope of the present invention as claimed.

What is claimed is:

1. An electronic apparatus comprising a computer main body including a display portion and keyboard portion, an external output unit comprising a printer integrally coupled with said computer main body such that an electrical connection is made between said main body and external output unit by said coupling, a control knob for controlling a function on said computer main body disposed on a side of said computer main body where said computer main body is joined to said printer output unit, an adjustment knob provided on an outside surface of said printer output unit so that it is accessible when said main body and output unit are coupled to each other, operable for causing said control knob to operate in conjunction therewith, and transmission means for transmitting an operating force applied to said adjustment knob to said control knob of said main body when coupled with said output unit, whereby control of said computer main body is accomplished by manipulation of the adjustment knob of said printer output unit when said computer main body and printer output unit are coupled.

2. The electronic apparatus of claim 1, wherein said transmission means is a rubber roller.

3. The electronic apparatus of claim 1, wherein said adjustment knob adjusts the contrast of a display on said display portion.

* * * * *